United States Patent

Nordwall

[11] Patent Number: 6,097,943
[45] Date of Patent: Aug. 1, 2000

[54] APPLICATION BOUND PARAMETER STORAGE

[75] Inventor: Thomas Nordwall, Malmö, Sweden

[73] Assignee: Telefonaktiebolaget L M Ericsson, Stockholm, Sweden

[21] Appl. No.: 08/886,899

[22] Filed: Jul. 2, 1997

[51] Int. Cl.[7] .................................................. H04Q 7/00
[52] U.S. Cl. .......................... 455/418; 455/556; 455/569; 455/573; 379/441
[58] Field of Search ..................... 455/418, 556, 455/557, 559, 569, 573, 575, 90, 558; 379/441, 442

[56] References Cited

U.S. PATENT DOCUMENTS

| | | | |
|---|---|---|---|
| 5,249,218 | 9/1993 | Sainton | 455/418 |
| 5,400,389 | 3/1995 | Niiyama et al. | 455/418 |
| 5,420,912 | 5/1995 | Kopp et al. | 379/63 |
| 5,457,814 | 10/1995 | Myrskog et al. | 455/127 |
| 5,464,288 | 11/1995 | Falvey et al. | 455/418 |
| 5,465,401 | 11/1995 | Thompson | 455/89 |
| 5,475,731 | 12/1995 | Rasmusson | 379/3 |
| 5,479,476 | 12/1995 | Finke-Anlauff | 455/418 |
| 5,495,518 | 2/1996 | Hayashi | 455/418 |
| 5,572,110 | 11/1996 | Dunstan | 320/30 |
| 5,774,793 | 6/1998 | Cooper et al. | 455/89 |
| 5,796,819 | 8/1998 | Romesburg | 379/406 |
| 5,815,732 | 9/1998 | Cooper et al. | 395/856 |
| 5,819,175 | 10/1998 | Niemi | 455/418 |
| 5,884,191 | 3/1999 | Karpus et al. | 455/557 |

FOREIGN PATENT DOCUMENTS

| | | |
|---|---|---|
| 0 396 190 A2 | 11/1990 | European Pat. Off. . |
| 0 712 231 A2 | 5/1996 | European Pat. Off. . |
| 2 251 515 | 7/1992 | United Kingdom . |
| WO 93/12604 | 6/1993 | WIPO . |
| WO 97/03512 | 1/1997 | WIPO . |
| WO 98/00993 | 1/1998 | WIPO . |

OTHER PUBLICATIONS

EPO International Search Report dated Oct. 19, 1998.

*Primary Examiner*—Curtis A. Kuntz
*Assistant Examiner*—Binh K. Tieu
*Attorney, Agent, or Firm*—Jenkens & Gilchrist, P.C.

[57] ABSTRACT

An accessory item for performing an ancillary function for a mobile radio subscriber station includes a separate memory within which parameter values calculated by the processor of the mobile station and related to performance of the ancillary function are stored. The parameter values are retrieved by the same or a different mobile station on a subsequent occasion and used to perform the ancillary function without having to recalculate the parameter values.

20 Claims, 2 Drawing Sheets

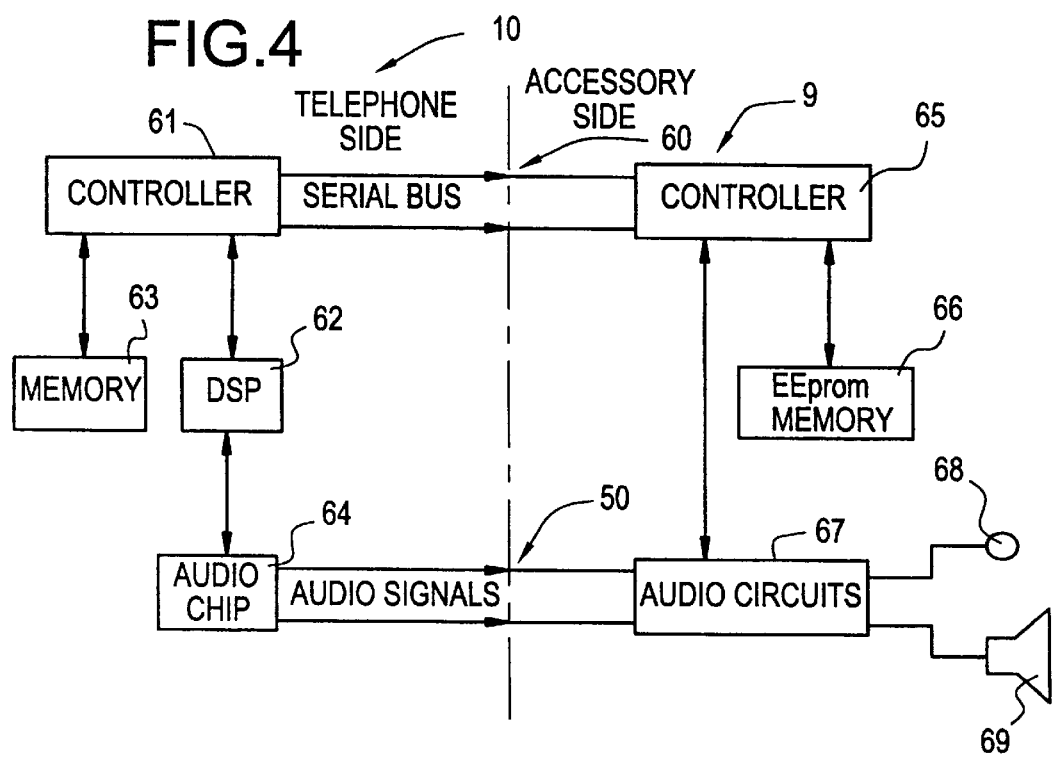
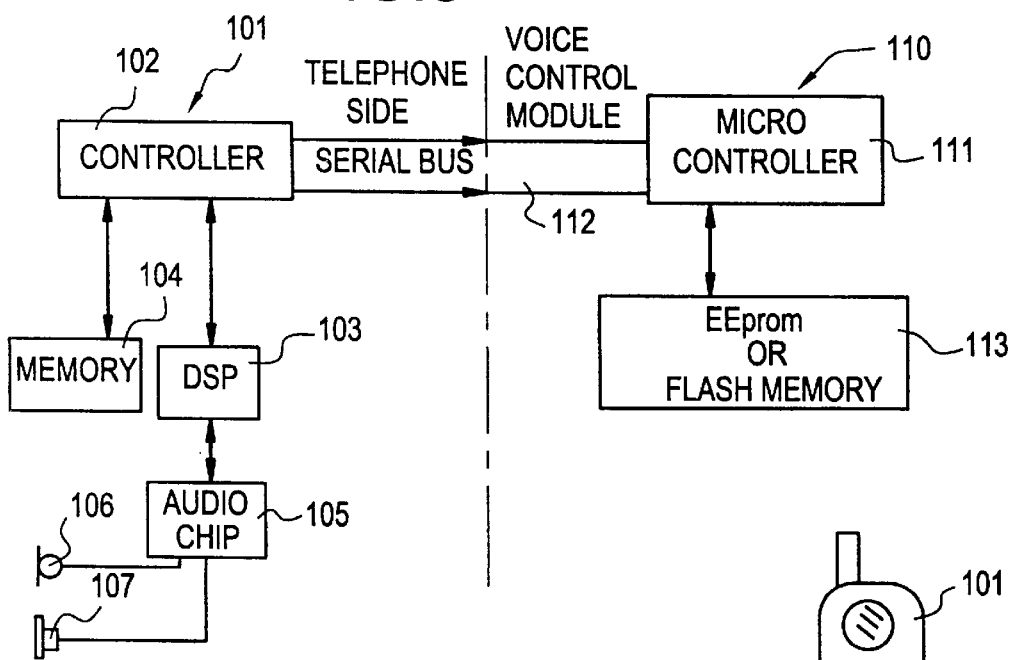
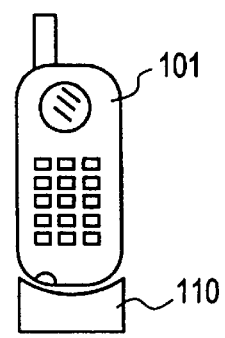

APPLICATION BOUND PARAMETER STORAGE

BACKGROUND OF THE INVENTION

1. Field of the Invention

The invention relates to portable cellular radio telephone equipment and, more particularly, to the storage of parameters within a memory contained in accessory items used with such radio telephones.

2. Description of the Related Art

With the increasing usage of cellular radio telephone equipment, there has also developed a large number of accessory items which are used with and adjunctive to such radio telephones. For example, such accessory items vary from carrying cases for the mobile telephones to small personal ear phones and microphones which enable a mobile user to place and receive telephone calls while engaged in other activities, such as riding a bicycle.

A number of common accessory items require a high degree of interactivity with the mobile telephone in order to provide their ancillary application function. For example, in order to provide for hands free operation of a mobile telephone within an automobile, circuitry must be provided to suppress the echoes normally generated by the acoustic reflection and feedback of speech sounds within the interior of the automobile. Echo generation is caused by acoustic coupling due to the fact that speech is output from the loudspeaker of the hands free accessory and is input to the microphone used to pick up the voice of the speaker within the automobile. Such coupling between the loudspeaker and the microphone produces speech circulation which generates an echo or reverberation within the system thereby degrading telecommunications. In addition, sounds generated by both the user of the hands free unit and the loudspeaker within the closed space of the automobile spreads throughout that space and strikes a variety of both hard and soft obstructions and surfaces within the automobile. Part of these sounds are absorbed and attenuated by the objects they strike while the remaining sounds are reflected from hard surfaces to strike other objects and be repeatedly partially reflected and partially absorbed. The repeatedly reflected sounds within the automobile are also input into the microphone, and thus into the transmission system, thereby generating further echoes within the telecommunications system.

It is known within the cellular radio telecommunications arts to provide circuitry within the radio telephone instrument which serves to electronically cancel echoes generated within an automobile and thereby provide a higher quality of telecommunication through a hands free system. The algorithms used to model the echoes arising from reflected speech within an automobile require calculation of a large number of parameter values which are unique to the particular environment of the automobile within which the hands free accessory item is used. The calculation of these parameter values by a Digital Signal Processor (DSP) within the mobile telephone requires a finite time period in order to successfully construct a mathematical model of the acoustic environment and, thus, be able to cancel out the echoes. These parameter values are generally stored within the memory of the mobile station which performed the echo cancellation calculations. If the same mobile radio telephone unit is used within the same automobile environment repeatedly, the stored echo cancellation parameter values within that mobile station can be retrieved from the memory of the mobile and reused without requiring a recalculation of the data. If, however, a different mobile station is used within the automobile, echo cancellation parameter values must be recalculated within that particular mobile station in order to accomplish the echo cancellation function. It would be an advantage if echo cancellation parameter values could be stored within a memory contained within the hands free accessory item carried by the automobile so that regardless of which mobile station was used in the hands free accessory of that automobile, no recalculation would be required and the same parameter values associated with the internal acoustic environment of that automobile could be repeatedly reused for echo cancellation purposes.

Another mobile subscriber station accessory feature which is growing in popularity is a voice recognition control unit which enables the mobile to electronically recognize words spoken by a user and execute those commands in response. Voice recognition technology is primarily of a speaker dependant variety and must be trained to recognize the voice commands of a particular user. In order to implement voice recognition within a mobile radio telephone the processor of the mobile must calculate many different voice parameters associated with the characteristics of a particular user's voice and speech patterns. Such parameter values are unique to each user. If a separate modular voice control unit is equipped with an independent memory for storing the voice parameter values of an associated user, and connected to a compatible mobile, the mobile can recognize and respond to voice commands to it by that user.

A further exemplary accessory item commonly used with mobile radio telephones is a battery charger. It would be an advantage if a charger could tell the mobile telephone what type of charger it is, i.e. whether it is constant current, AC/DC, etc. and its mean and peak current capacities. Such items of information could be stored within a separate memory in the battery charger and automatically delivered to the mobile station when it is plugged in for recharging.

BRIEF SUMMARY OF THE INVENTION

In one aspect, the present invention includes an accessory item for a mobile radio telecommunications subscriber station which is selectively connectable to the accessory. The accessory item contains circuitry for performing a function ancillary to that of the mobile radio telecommunications subscriber station and a memory for the storage of a plurality of parameters values related to the ancillary function. When the accessory item is connected to the subscriber station one or more of the parameter values stored in the memory of the accessory are provided to the subscriber station as part of the performance of the ancillary function by the accessory. In one embodiment, the accessory provides hands free mobile subscriber capabilities and in another it provides voice recognition and control capabilities for the mobile subscriber station. In still another embodiment the accessory item is a battery charger.

In another aspect, the present invention includes a method and system for providing an ancillary function for a mobile radio telecommunications subscriber station which includes digital signal processing capability and a way to selectively connect to an accessory item for performing the ancillary function. The mobile subscriber station is connected to the accessory and the processor within the mobile subscriber station performs calculations related to the performance of the ancillary function. The calculations generate a plurality of parameter values related to the ancillary function which are stored in a memory contained within the accessory item. The stored parameter values are subsequently retrieved from the memory of the accessory by the processor of the same or a different mobile subscriber station and used in the performance of the ancillary function on an occasion subsequent to the occasion during which the parameter values were calculated and stored. In one embodiment of this aspect, the calculations are performed within the digital signal processor of the mobile subscriber station and relate to echo cancellation. The parameter values calculated by the processor and stored in the memory of the accessory item are unique to the environment within which the echo cancellation accessory item is located. In another embodiment, the calculations are performed within the digital signal processor of the mobile subscriber station and relate to speaker dependent voice recognition. The parameter values stored in the memory of the accessory item are related to voice recognition training parameters of a user associated with the accessory item.

BRIEF DESCRIPTION OF THE DRAWINGS

For an understanding of the present invention and for further objects and advantages thereof, reference can now be had to the following description, taken in conjunction with the accompanying drawings in which:

FIG. 4 is a block diagram of a radio telephone connected to a hands free accessory unit which stores echo cancellation parameter values in accordance with one aspect of the present invention;

FIG. 5 is a block diagram of a radio telephone connected to a voice recognition control unit accessory item constructed in accordance with another aspect of the present invention; and FIG. 6 is a pictorial drawing of a radio telephone with a voice recognition control accessory unit constructed in accordance with the present invention attached to it.

DETAILED DESCRIPTION OF THE PREFERRED EMBODIMENT

Figure 1:
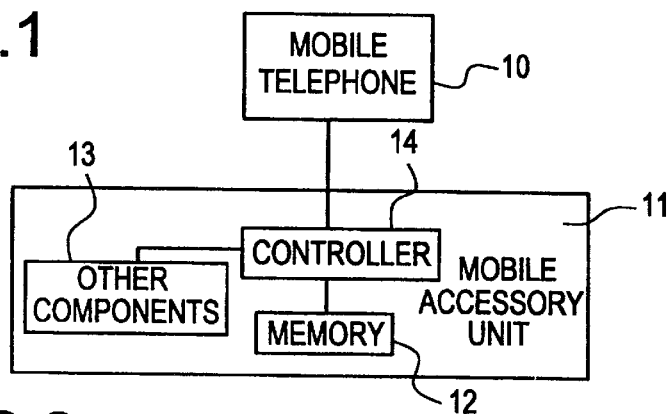
FIG. 1 is a block diagram illustrating one broad aspect of the system of the present invention.

Referring to FIG. 1, there is shown a block diagram of a mobile telephone connected in association within an accessory item constructed in accordance with the teachings of the present invention. More particularly, in the embodiment of the invention shown in FIG. 1, the mobile telephone 10 is connected to an accessory item 11, such as a mobile hands free accessory unit mounted, for example, within the interior of an automobile. The hands free accessory unit 11 allows the user of the mobile telephone to communicate through the mobile telephone network by speaking into a microphone located within the automobile and hear the other party speak through a loudspeaker also located within the automobile. Due to the fact that sound is coupled from the loudspeaker of the hands free unit to the microphone within the automobile and the fact that sounds produced by the voice of the user as well as the speaker are selectively reflected from and absorbed by different surfaces within the interior of the automobile, an echo is produced making communication over the telecommunications network difficult. For this reason, echo cancellation units are typically used to mathematically model the acoustic environment of an automobile and generate signals which can cancel out the echoes occurring within the interior of the automobile and render the communication over the network much more effective. As pointed out above, the calculations performed in accordance with modeling algorithms for echo cancellation are generally done by a digital signal processor (DSP) contained within the mobile telephone unit. The calculations generate a plurality of modeling parameter values which are unique to the environment within the automobile where the echoes are occurring. The parameter values are conventionally stored within a memory located within the telephone instrument. Thus, when a different mobile telephone instrument is used with the hands free accessory item located within the automobile, the modeling parameter values associated with the echo cancellation algorithm must be recalculated and restored within the memory of that mobile station in order to be used for echo cancellation.

In contrast with the prior art systems, the system of the present invention, illustrated in FIG. 1, provides within a mobile accessory unit 11 itself, a memory 12 within which is stored parameter values calculated for use in performing the ancillary function of the accessory. In the case in which the accessory is a hands free unit the parameter values are unique to the acoustic environment in which the accessory item 11 is located. The memory 12 may include reasonable memory devices such as a flash memory or an electronically erasable programmable read only memory (EEPROM). The memory 12 as well as other components 13 of the accessory unit communicate with the mobile telephone 10 by means of a controller unit 14. The controller 14 comprises a microcontroller which is capable of data communication and data exchange between the accessory unit 11 and the mobile telephone 10. It also has the capability of identifying to the mobile telephone 10 the fact that the accessory unit 11 includes memory capabilities.

Figure 2:
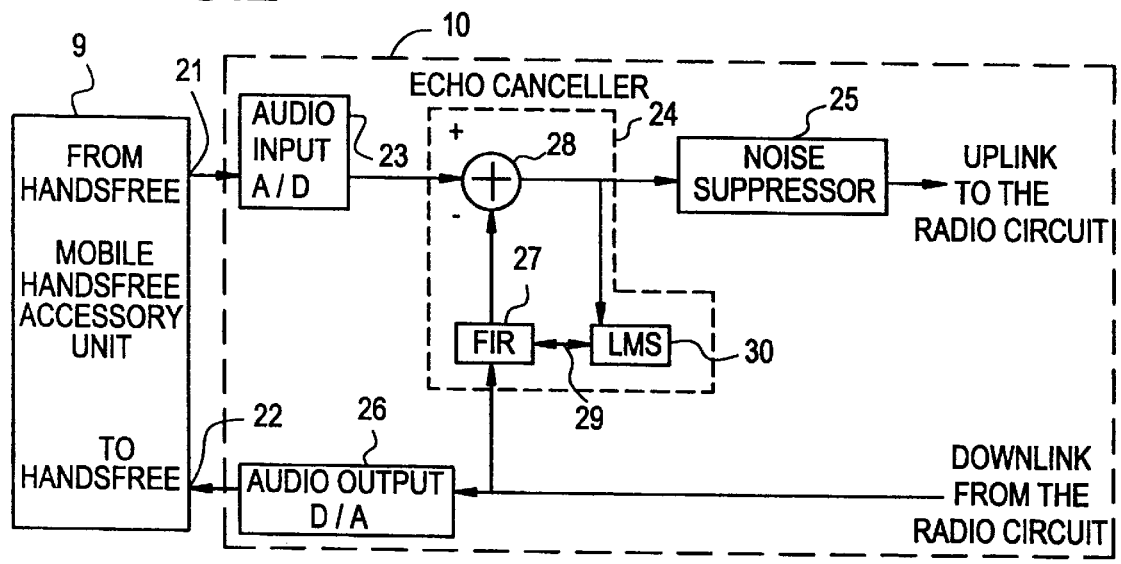
FIG. 2 is a schematic diagram illustrating an echo cancellation unit within an automobile hands free accessory unit.
Figure 3:
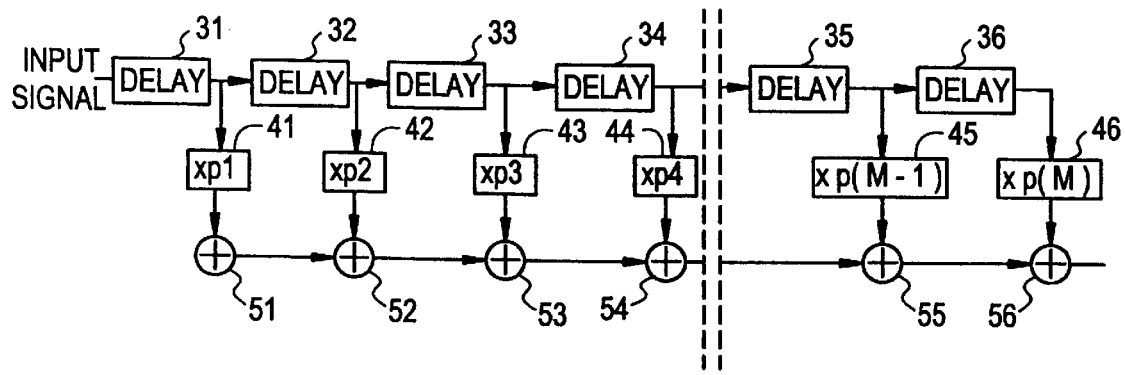
FIG. 3 is a schematic diagram of a FIR filter within an echo cancellation circuit.

In the event the mobile accessory unit 11 is a mobile hands free accessory unit for use within an automobile, as illustrated in the example discussed above, its interaction with the mobile telephone 10 will include echo cancellation capabilities, the circuitry for which is diagrammatically illustrated in FIGS. 2 and 3. The mobile hands free unit 9 is connected to the mobile telephone 10 by means of electrical connections which include couplings 21 and 22. It should be understood that the couplings 21 and 22 may be of either the wired or wireless type. For example, infrared (IR) signal couplings or radio frequency signals could be used to implement the signal connection between the mobile telephone and the accessory item. Analog audio signals from the microphone of the hands free unit 9 are coupled into an analog-to-digital converter 23 which delivers a digitized audio signal to an echo cancellation circuit 24. The digital output of the echo cancellation circuitry 24 is coupled through a noise suppressor 25 (which may also be adaptive like the echo cancellation circuit) to the radio circuit within the mobile telephone unit 10. Similarly, a digital audio signal from the radio circuit within the mobile telephone 10 is coupled through a digital-to-analog converter 26 and is connected to the mobile hands free accessory unit 9 through the electrical or wireless coupling 22. The analog output signal is used to drive the speaker associated with the mobile's hands free accessory unit 9.

All sounds inside the automobile, including those coming from the loudspeaker are picked up by the microphone of the hands free unit. From the microphone all sounds are sent via amplifiers into the radio circuit of the network. The sounds from the loudspeaker reach the microphone over various paths such as directly from loudspeaker to microphone as well as by reflection from various surfaces such as car windows. The different paths are modeled by a finite impulse response (FIR) digital filter. This filter consists of a number of delay circuits wherein the signal after each delay is multiplied by a parameter value ($P_f$–$P_m$) and then added to the output. The goal of echo cancellation is to set these parameter values so that the output from the FIR filter is an exact copy of the loudspeaker signal and its reflections which are picked up by the microphone. The signal can then be subtracted from the composite microphone output and produce a signal which represents only the voice of the user.

The illustrative echo cancellation software represented at 24 includes a least mean square (LMS) algorithm 30, a finite impulse response (FIR) filter 27 and a summing function 28. Digital input signals going to the digital-to-analog converter 26 are connected as inputs to the FIR filter 27 while the output thereof is connected to an input of the summing function 28 along with the digitized output signal from the analog-to-digital converter 23. The output signal from the summing function 28 is connected to the LMS algorithm 30 which adjusts the parameter values [$xp_i$–$xp(_m)$] of the FIR filter via link 29 and thereby models the acoustic environment to cancel out echoes arising from the loudspeaker of the mobile hands free accessory unit 9.

The construction of the mathematical model of the acoustic environment may be performed by a digital signal processor (DSP) executing, for example, a least mean square (LMS) algorithm which attempts to set the parameter values within the FIR filter to minimize the signal after the summing point. These parameter values are typically 16 bits in length and typically 200 in number (i.e., m=200) depending upon the precision required and the longest echo which must be modeled.

Referring next to FIG. 3, there is shown a block diagram of the FIR filter 27 which consists of a plurality of delay elements 31–36 the outputs of each of which are passed through a plurality of respective filtration units 41–46 the outputs of each are added in summers 51–56 to generate an output signal. Each of the filtration elements 41–46 include a filtration parameter [$xp_i$–$xp(_m)$] which is adjusted by the digital signal processor in accordance with an echo cancellation modeling algorithm. Once the user begins using the mobile hands free accessory unit 9 by speaking into the microphone and listening to the other party through the speaker, the digital signal processor executes the algorithm and calculates the appropriate parameter values for each of the filtration units 41–46 so that echoes within the system are minimized.

Referring next to FIG. 4, there is shown a more detailed block diagram of one aspect of the system of the present invention. Mobile telephone 10 includes a microcontroller 61 with which is associated a digital signal processor 62, a memory 63 and an audio processing chip 64. The hands free accessory includes a microcontroller 65 coupled to the microcontroller 61 of the mobile telephone via a serial data bus 60. The serial data bus 60 may be either wired or wireless, as mentioned above. The accessory unit controller 65 is connected to a memory 66 as well to an audio circuit 67 receiving signal from the mobile telephone 10 via a connection 50. The audio circuit 67 is connected, in turn, to a microphone 68 and a loudspeaker 69. As discussed above, the echoes and other noise related to the environment within which the hands free accessory 9 is located, are compensated for by the echo cancellation circuitry within the telephone 10. The digital signal processor 62 in the telephone carries out the necessary signal processing in accordance with an acoustic echo canceling and noise reduction mathematical modeling algorithm. A result of this process is the generation of a plurality of parameter values, such as FIR filter co-efficients and the like, which are used to construct a mathematical model of the acoustical environment within which the hands free equipment is being used. These parameter values are temporarily stored in the memory 63 and used to process speech signals to and from the accessory to improve the quality of the communication. During or at the termination of the call, a copy of each of these parameter values calculated by the digital signal processor echo cancellation algorithm is sent via the serial bus 60 and the controller 65 to the memory 66 of the accessory unit 9 where they are stored and thus bound to the application with which they are to be used. Upon the next usage of the hands free accessory to place a call, either by means of the same mobile station which placed the last call through the hands free accessory and calculated the parameter values stored in memory 66 or by a different mobile station, the mobile telephone station connected to the hands free unit accesses the parameter values stored within the memory 66 to perform its echo calculation function. This eliminates the necessity of the processor in the mobile having to recalculate the echo cancellation FIR filter co-efficient parameters and the resultant time and processing burden necessary to do so. The controller 65 enables the storage and retrieval of the various parameters from the memory 66 by informing the mobile station 10 of the existence of its memory capabilities and the values stored therein.

Referring now to FIG. 5, there is shown a detail block diagram of another aspect of the system of the present invention which incorporates memory functionality into a voice recognition and control module for a mobile telephone. Mobile telephone 101 includes a microcontroller 102 which is associated with a digital signal processor 103, a memory 104 and an audio processing chip 105. The audio processing chip 105 is connected to a microphone 106 for input of the voice of a user and a speaker 107 for the output of sound to the user. The voice control module accessory 110 includes a microcontroller 111 coupled to the microcontroller 102 of the mobile telephone via a serial bus 112. The serial data bus 112 may be either wired or wireless, as mentioned above. The voice control module microcontroller 111 is also connected to a memory 113 which may comprise various types of nonvolatile memory, such as an EEPROM or flash memory.

As discussed briefly above, voice recognition and voice control of a mobile telephone is generally implemented by means of a digital signal processor executing voice recognition algorithms within the mobile telephone. While speaker independent voice recognition is very difficult to implement, speaker dependent voice recognition can readily recognize the utterances of a single speaker it has been trained to recognize. Typically, certain specific vocal utterances such as names, command words, numbers and the like are used to achieve recognition within the voice recognition algorithms by being trained in some sort of training procedure. This enables the algorithms to calculate certain voice parameter data which is uniquely characteristic of both the speech patterns of the user as well as certain specific spoken words. If the mobile telephone incorporating voice recognition is used by more than one person, such as by the members of a family, each person has to train the voice recognition algorithms within the phone and all of the voice recognition parameters calculated by the algorithms which are necessary to recognize specific words from each separate speaker must be stored in the memory of the phone. This readily consumes the limited amount of storage space which is available within the memory of the mobile subscriber station.

In the system of the present invention, the mobile phone is selectively connectable to different voice control modules, sometimes referred to as "personal voice plugs," which are personally associated with each individual who is to use the phone and train it for recognition of his or her voice. The voice recognition parameters associated with that individual are stored within that individual's voice recognition module and not in the memory of the telephone itself. The personal voice recognition module can also contain a personal phone book by recording numbers either associated with certain names to be recognized by the voice recognition algorithm or by an abbreviated number code to be entered into the telephone. Each individual will have his or her own voice control module which contains his or her own voice recognition parameter values and phone book. When the voice recognition module is connected to any phone and that phone is used in voice recognition mode, it will retrieve the voice parameters associated with that individual and use them in the voice recognition algorithm to recognize names, words, commands and numbers spoken by that individual into the phone.

Referring next to FIG. 6, there is shown a mobile radio telephone subscriber unit 101 connected with a personal voice control module 110 for operative usage by the individual whose parameters are stored in the memory of the voice control module 110.

It may also be seen that the present invention can be used to execute various types of algorithms, such as signal processing, voice recognition, data handling, charging control, etc. through use of a mobile station processing capabilities and which may produce certain parameter values which are then stored in a memory contained within an accessory item for future usage. This feature provides increased service flexibility within a telephone accessory unit while at the same time eliminating the need to include expensive digital signal processors within that accessory unit.

It may also be understood that additional accessory items can be implemented within the system and method of the present invention by the providing the necessary data processing capabilities with the mobile telephone digital signal processors and then storing calculated parameter values within the memory of the accessory item. This avoids the necessity of repeated recalculation of those parameters. Such functionality can be imparted into, for example, a battery charger accessory item in which parameters identifying the current, voltage and other parameters that the battery charger produces are stored in a memory within the charger. This enables the mobile station to immediately recognize the capabilities of the charger from the parameter values stored in its memory and adapt its circuitry to the receipt and usage of that particular type of charging functionality.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. An accessory item for a mobile radio telecommunications subscriber station which includes means for connecting to said accessory item, said accessory item comprising:

circuitry for performing a function ancillary to that of the mobile radio telecommunications subscriber station;

an input operable to receive a plurality of parameter values related to the ancillary function of the accessory item from the mobile subscriber station via the connecting means in response to the mobile subscriber station calculating said plurality of parameter values during an initial performance of the ancillary function of said accessory item;

a memory for the storage of said plurality of parameter values related to the ancillary function of the accessory item;

means for providing one or more of said parameter values stored in the memory of said accessory item to said subscriber station via the connecting means in response to the same or a different mobile subscriber station requesting said parameter values from said accessory item to allow said mobile subscriber station to configure itself as part of a subsequent performance of the ancillary function by said accessory item.

2. An accessory item as set forth in claim 1 wherein said accessory item provides hands free mobile subscriber capabilities and includes a microphone and speaker.

3. An accessory item as set forth in claim 1 wherein said accessory item provides voice recognition and control capabilities to said mobile subscriber station.

4. An accessory item as set forth in claim 1 wherein said accessory item provides battery charging capabilities for said mobile subscriber station.

5. An accessory item as set forth in claim 1 wherein said means for connecting said accessory item to said subscriber station includes a wired electrical connection.

6. An accessory item as set forth in claim 1 wherein said means for connecting said accessory item to said subscriber station includes a wireless signal connection.

7. An accessory item as set forth in claim 1 wherein said subscriber station also includes a digital signal processor for execution of an algorithm for the processing of data related to the ancillary function of said accessory item and wherein execution of said algorithm produces parameter values which are stored by said processor in the memory of said accessory item for subsequent retrieval by a subscriber station for a subsequent performance of said ancillary function.

8. An accessory item as set forth in claim 7 wherein said ancillary function is that of hands free mobile capabilities, said algorithm is a least mean square function related to echo cancellation within said hands free accessory item and said parameter values stored in the memory of said accessory item are related to FIR filter parameter values.

9. An accessory item as set forth in claim 7 wherein said ancillary function is that of voice recognition and control capabilities, said algorithm is a function related to speaker dependant voice recognition and said parameter values stored in the memory of said accessory item are related to the voice recognition training parameters of a user associated with the accessory item.

10. An accessory item as set forth in claim 4 wherein said subscriber station also includes a microcontroller for the processing of data related to the ancillary function of said accessory item and wherein the parameter values stored in the memory of said accessory item and accessed by said processor relate to the type of battery charger the accessory item includes and its mean and peak currents.

11. A method for providing an ancillary function for a mobile radio telecommunications subscriber station which includes digital signal processing capability and means to connect to an accessory item, containing a memory, for performing said ancillary function, said method comprising the steps of:

connecting said mobile subscriber station to said accessory item;

performing calculations within the processor of said mobile subscriber station during an initial performance of said ancillary function by said accessory item, said calculations generating a plurality of parameter values related to said ancillary function and for use by said mobile subscriber station in configuring itself;

storing said plurality of parameter values in said memory contained within said accessory item; and subsequently retrieving said stored parameter values from the memory of said accessory item by the processor of the same or a different mobile subscriber station, said processor using said previously calculated parameter values to configure the same or different mobile subscriber station in a subsequent performance of said ancillary function.

12. A method for providing an ancillary function for a mobile radio telecommunications subscriber station which includes digital signal processing capability and means to connect to an accessory item for performing said ancillary function as set forth in claim 11 wherein the ancillary function performed by said accessory item is hands free mobile subscriber capabilities and wherein said step of performing calculations includes:

executing an algorithm within the digital signal processor of said mobile subscriber station which relates to echo cancellation and includes a least mean square function and said parameter values calculated by said processor and stored in the memory of said accessory item are unique to the acoustic environment within which the echo cancellation accessory item is located.

13. A method for providing an ancillary function for a mobile radio telecommunications subscriber station which includes digital signal processing capability and means to connect to an accessory item for performing said ancillary function as set forth in claim 11 wherein the ancillary function performed by said accessory item is voice recognition and control capabilities and wherein said step of performing calculations includes:

executing an algorithm within the digital signal processor of said mobile subscriber station which relates to speaker dependent voice recognition and said parameter values stored in the memory of said accessory item are related to the voice recognition training parameters of a user associated with the accessory item.

14. A method for providing an ancillary function for a mobile radio telecommunications subscriber station which includes digital signal processing capability and means to connect to an accessory item for performing said ancillary function as set forth in claim 11 wherein said step of connecting said mobile subscriber station to said accessory item includes:

making said connection with a wired electrical connector.

15. A method for providing an ancillary function for a mobile radio telecommunications subscriber station which includes digital signal processing capability and means to connect to an accessory item for performing said ancillary function as set forth in claim 11 wherein said step of connecting said mobile subscriber station to said accessory item includes:

making said connection with a wireless communications connection.

16. A system for providing an ancillary function for a mobile radio telecommunications subscriber station which includes digital signal processing capability and means to connect to an accessory item, containing a memory, for performing said ancillary function, said system comprising:

means for connecting said mobile subscriber station to said accessory item;

means for performing calculations within the processor of said mobile subscriber station during an initial performance of said ancillary function by said accessory item, said calculations generating a plurality of parameter values related to said ancillary function and for use by said mobile subscriber station in configuring itself;

means for storing said plurality of parameter values in said memory contained within said accessory item; and means for subsequently retrieving said stored parameter values from the memory of said accessory item by the processor of the same or a different mobile subscriber station, said processor using said previously calculated parameter values to configure the same or different mobile subscriber station in a subsequent performance of said ancillary function.

17. A system for providing an ancillary function for a mobile radio telecommunications subscriber station which includes digital signal processing capability and means to connect to an accessory item for performing said ancillary function as set forth in claim 16 wherein the ancillary function performed by said accessory item is hands free mobile subscriber capabilities and wherein said means for performing calculations includes:

means for executing an algorithm within the digital signal processor of said mobile subscriber station which relates to echo cancellation and includes a least mean square function and said parameter values calculated by said processor and stored in the memory of said accessory item are unique to the acoustic environment within which the echo cancellation accessory item is located.

18. A system for providing an ancillary function for a mobile radio telecommunications subscriber station which includes digital signal processing capability and means to connect to an accessory item for performing said ancillary function as set forth in claim 16 wherein means for connecting said mobile subscriber station to said accessory item comprises:

a wired electrical connection.

19. A system for providing an ancillary function for a mobile radio telecommunications subscriber station which includes digital signal processing capability and means to connect to an accessory item for performing said ancillary function as set forth in claim 16 wherein means for connecting said mobile subscriber station to said accessory item comprises:

a wireless communications connection.

20. A system for providing an ancillary function for a mobile radio telecommunications subscriber station which includes digital signal processing capability and means to connect to an accessory item for performing said ancillary function as set forth in claim 16 wherein the ancillary function performed by said accessory item is voice recognition and control capabilities and wherein said means for performing calculations includes:

means for executing an algorithm within the digital signal processor of said mobile subscriber station which relates to speaker dependant voice recognition and said parameter values stored in the memory of said accessory item are related to the voice recognition training parameters of a user associated with the accessory item.

* * * * *